(12) United States Patent
Davis et al.

(10) Patent No.: US 7,899,825 B2
(45) Date of Patent: Mar. 1, 2011

(54) METHOD AND APPARATUS FOR DUPLICATE DETECTION

(75) Inventors: Mark W. Davis, Tracy, CA (US); John Murphy, San Jose, CA (US); Paul Grant Carter, San Francisco, CA (US)

(73) Assignee: Sap America, Inc., Newtown Square, PA (US)

( * ) Notice: Subject to any disclaimer, the term of this patent is extended or adjusted under 35 U.S.C. 154(b) by 389 days.

(21) Appl. No.: 12/098,333

(22) Filed: Apr. 4, 2008

(65) Prior Publication Data
US 2008/0243837 A1 Oct. 2, 2008

Related U.S. Application Data

(63) Continuation of application No. 09/893,299, filed on Jun. 27, 2001, now abandoned.

(51) Int. Cl.
G06F 7/00 (2006.01)
G06F 17/30 (2006.01)

(52) U.S. Cl. ........................................................ 707/737
(58) Field of Classification Search .................. 707/736, 707/737, 754
See application file for complete search history.

(56) References Cited

U.S. PATENT DOCUMENTS

| 5,799,148 | A | * | 8/1998 | Cuddihy et al. ................. 714/26 |
| 5,933,823 | A | * | 8/1999 | Cullen et al. ......................... 1/1 |
| 5,943,670 | A | | 8/1999 | Prager |
| 6,003,027 | A | | 12/1999 | Prager |
| 6,138,113 | A | | 10/2000 | Dean et al. |
| 6,286,006 | B1 | | 9/2001 | Bharat et al. |
| 6,493,702 | B1 | | 12/2002 | Adar et al. |
| 6,547,829 | B1 | | 4/2003 | Meyerzon et al. |
| 6,611,825 | B1 | | 8/2003 | Billheimer et al. |
| 6,615,209 | B1 | | 9/2003 | Gomes et al. |
| 6,654,739 | B1 | * | 11/2003 | Apte et al. ............................ 1/1 |
| 6,658,423 | B1 | | 12/2003 | Pugh et al. |
| 6,684,205 | B1 | * | 1/2004 | Modha et al. ........................ 1/1 |
| 6,751,600 | B1 | | 6/2004 | Wolin |
| 6,892,193 | B2 | * | 5/2005 | Bolle et al. ....................... 706/20 |
| 6,978,419 | B1 | * | 12/2005 | Kantrowitz ................... 715/209 |
| 6,993,517 | B2 | * | 1/2006 | Naito et al. .......................... 1/1 |
| 7,089,238 | B1 | * | 8/2006 | Davis et al. .................... 707/737 |
| 7,158,961 | B1 | * | 1/2007 | Charikar .............................. 1/1 |
| 7,376,635 | B1 | * | 5/2008 | Porcari et al. ........................ 1/1 |

OTHER PUBLICATIONS

William B. Frakes and Ricardo Baeza-Yates, "Information Retrieval Data Structures & Algorithms," pp. 19-71, Dated Jun. 12, 1992.
Ian H. Witten et al., "Managing Gigabytes Compressing and Indexing Documents and Images," pp. 181-188, Published 1999.
Fazli Can et al., "A Dynamic Cluster Maintenance System for Information Retrieval," SIGIR 1987 pp. 123-131.
Fazli Can et al., "Concepts of the Cover Coefficient-Based Clustering Methodology," SIGIR 1985 pp. 204-211.
Broder, Andrei, "On the Resemblance and Containment of Documents," Proceedings of Compression and Complexity of Sequences, pub. Jun. 1997, pp. 21-29, IEEE Computer Society 1988.

(Continued)

*Primary Examiner* — James Trujillo
*Assistant Examiner* — Jeffrey Burke
(74) *Attorney, Agent, or Firm* — Cooley LLP

(57) ABSTRACT

The present invention includes a method and device for detecting duplicate documents by triangulation. Particular aspects of the present invention are described in the claims, specification and drawings.

10 Claims, 6 Drawing Sheets

OTHER PUBLICATIONS

Broder, Andrei, "Some Applications of Rabin's Fingerprinting Method," published in Sequences II: Methods in Communication, Security, and Computer Science, Springer-Verlag, 1993, 10 pages.

Salton, G. et al. "A Vector Space Model for Automatic Indexing," Communication of the ACM, Nov. 1975, vol. 18, No. 11, pp. 613-620.

Narayann Shivakumar and Hector Garcia-Molina, "The SCAM Approach to Copy Detection in Digital Libraries," Department of Computer Science, Stanford University, Stanford, CA 94305 USA, Published 1995.

Daniel P. Lopresti, "A Comparison of Text-Based Methods for Detecting Duplication in Document Image Databases," Document Recognition and Retrieval VII (IS&T/SPIE Electronic Imaging 2000), Jan. 2000, San Jose, CA.

* cited by examiner

METHOD AND APPARATUS FOR DUPLICATE DETECTION

CROSS REFERENCE TO RELATED APPLICATIONS

This application is a continuation of pending U.S. application Ser. No. 09/893,299, filed Jun. 27, 2001, entitled "Apparatus and Method for Duplicate Detection", the contents of which are incorporated by reference.

BACKGROUND OF THE INVENTION

Duplicate detection and elimination or flagging are processes that are useful in many contexts. Systems that utilize a data collection as a basis for decision making suffer from bloat and loss of accuracy due to duplicate data samples. For instance, a categorization by example system, which attempts to code data samples in a manner similar to one or more data samples in a training set, can be skewed due to the effective doubling (or worse) of the influence measures when duplicate samples appear in the training set. This results in inaccurate coding. Furthermore, duplicate samples in the training set often represent wasted space in a system's indexing of the data collection set. This may be significant when the collection contains millions of samples. Other systems may track duplicate entries, benefiting from accurate identification of duplicate or near duplicate data samples. For instance, a litigation support system may manage images of documents, optical character recognition processed documents, or volumes of e-mail. Management may include looking for duplicates, to determine which parties received certain information. Thus, duplicate detection can be useful either to eliminate the duplicates or to flag them.

SUMMARY OF THE INVENTION

The present invention includes a method and device for detecting duplicate documents by triangulation. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
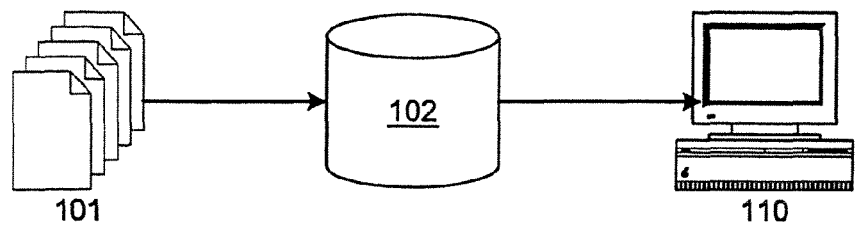
FIG. 1 is a flow diagram for adding documents to a set.

FIG. 1 is a high-level block diagram that depicts adding documents 101 to a database 102 for retrieval by a user from a terminal 110. In this context, a document generically may include text, images, recordings, and other data sets. Text documents may include visual formatting information, as in HTML, RTF, typeset or other formats, or they may not. A database may include any type of data storage adapted to searching and retrieval. The user's terminal may be near the database, connected to the database by a LAN or Intranet, or remote from the database, connected by a wide area network, a private network, a virtual private network or any other suitable communications link.

The documents 101 added to the database 102 often contain duplicates, either among the documents being added or between the documents being added and the documents already in the database. Duplication may involve exact duplicates or close duplicates. The objective of duplicate detection may be to delete or merge duplicate items or to record the duplication for later use.

Figure 2:
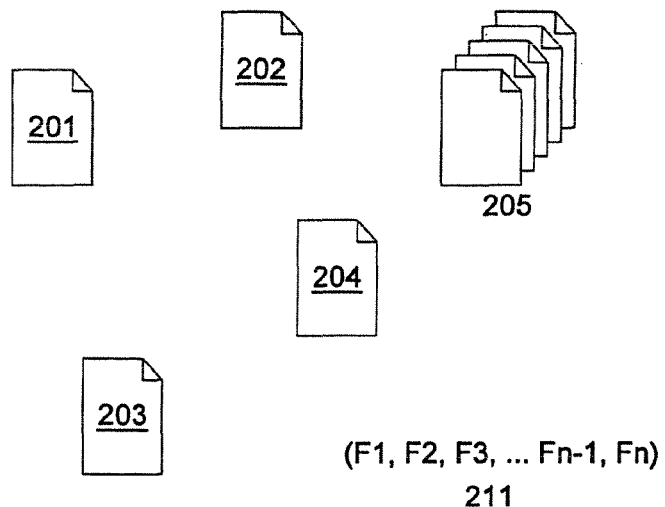
FIG. 2 illustrates nearest neighbor and feature vector concepts.

FIG. 2 depicts determination of similarity among documents. Much has been written about nearest neighbor algorithms. One of ordinary skill in the art will understand organizing items of data in accordance with their nearest neighbors and calculating similarity values. In FIG. 2, document 201 can be represented by a feature vector 211. For a text document, the feature vector 211 may have entries corresponding to words appearing in the document. This feature vector may identify words as appearing or not appearing, or it may indicate the frequency with which a word appears in document 201. For a recording of spoken language the feature vector may be based on morphemes, phonemes, formats, or larger or smaller units of sound. For an image or sound recording, the feature vector may identify the size of the image or recording and the spectral content of one or more regions or segments of the data. For a fingerprinted document, the feature vector may include characteristics of the fingerprint.

In FIG. 2, the three nearest neighbors of document 201 are documents 202, 203 and 204. The documents in set 205 are more distant from or less similar to document 201. Measures of distance or similarity discussed in the literature include coordinate matching, inner product similarity, relative term frequency measures, including term frequency inverse document frequency (TF/IDF) measures, a cosine measure of the angle between n-dimensional vectors and other scalar representations. See, Witten, I. H, Moffat, A and Bell, T. C., Managing Gigabytes (2d Ed.), pp. 180-188 (Morgan Kaufmann Pub. 1999); Baeza-Yates, R and Ribeiro-Neto, B, Modem Information Retrieval, pp. 19-71 (Addison Wesley 1999). The triangulation which is an aspect of the present invention can be used with any measure of similarity, either scalar or multi-dimensional. Lists of nearest neighbors of a document such as 201 can include a preselected number of "k" nearest neighbors, all neighbors satisfying a similarity threshold, or even all neighbors in the entire set. Reasonably short lists are easier to process for many purposes and easier to update. Longer lists can speed the duplicate detection process.

Figure 4:
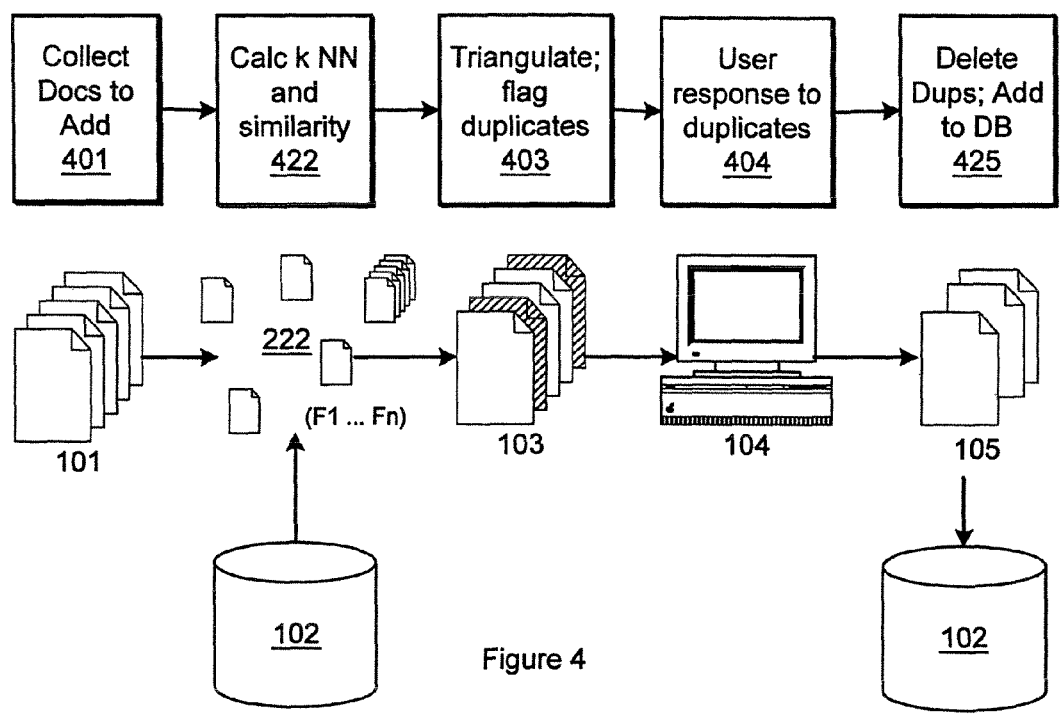
FIG. 4 is a flow diagram for duplicate elimination when documents are tested before addition to a set.

FIG. 4 includes a text block diagram of duplicate detection and a high level pictorial block diagram, similar to FIG. 1. The embodiment of the present invention depicted in this figure involves adding documents to a data set, calculating measures of similarity and then detecting duplicates in the updated set. Preliminary to document detection, documents 101 are collected 301 into a set to be added to a database 102. Feature vector 211 may be prepared for documents in the set 101 or for documents in the combined set 101 and database 102. Once the documents have been added, similarity measures are calculated or updated, using the feature vectors. Lists of nearest neighbors may be compiled, or similarity measures comparing all documents with all other documents may be recorded. Similarity measures with fine granularity may yield better results in duplicate detection than measures with coarse granularity.

One aspect of the present intention is triangulation to detect duplicates 303. Instead of comparing two documents directly, triangulation involves comparison of two documents to a reference document. If two documents have exactly the same similarity measure, they may be identical. In some embodiments, a high-precision scalar may yield a one-step duplicate identification process. In other embodiments, similar scalars may trigger further steps, such as a direct comparison of the two documents having similar scalars. The direct comparison may involve comparing the feature vectors of the two documents or a direct pattern comparison between the documents. Or, a more elaborate feature vector may be constructed from each document. For example, instead of a feature being whether or not a word appears in a document, the feature may be the frequency of the word in the document. Many equivalent ways of following up on an indication of similarity can readily be devised.

Triangulation can be very fast when lists of nearest neighbors and measures of similarity are prepared for a different purpose than duplicate detection. When lists and measures are already available, relatively little computation is required simply to compare the similarity measures among entries of each list. For instance, items in a list can be sorted and sequentially compared to one another. In some circumstances, lists prepared for other purposes than duplicate detection will be pre-ordered and the ordering of the lists can be relied upon.

Triangulation using multiple lists can be used to cover the entire data set and to reinforce confidence in similarity, before any direct pattern comparison between documents is undertaken. Two different lists are prone to result in different duplicate detection results, because nearest neighbor relationships are not symmetrical. Returning to FIG. 2, it is apparent that document 204 is one of the three nearest neighbors of document 201. However, the adjacent set of documents 205 is closer to document 204 than is document 201, so document 201 is not one of the three nearest neighbors of document 204. The availability of lists and measures compiled for a different purpose facilitates reviewing every nearest neighbor list for an entire data set, with relatively little computational effort, especially if the available similarity measures are scalars.

Triangulation is not limited to exact similarity matches. A threshold may be selected to detect potential duplicates to documents with close, but not exactly the same similarity measures to a reference document. In some data sets, a degree of inaccuracy is inherent data collection. For instance, optical character recognition may produce slightly different versions of a document in successive scans and interpretations of the same page. Thus, triangulation can be practiced using a similarity threshold, instead of looking for exact matches in similarity scores.

The full process of duplicate detection may involve one, two or more steps. First, the scalar similarity factors are compared. Second, similarity indications from different lists of neighboring documents can be merged, to create larger sets of duplicates. Third (not necessarily this order) additional similarity comparisons, beyond comparing scalar similarity factors, can be undertaken, as described above. However triangulation is practiced, sets of duplicates are identified and flagged 303. In the document set 103, duplicates are indicated by shading.

Figure 5:
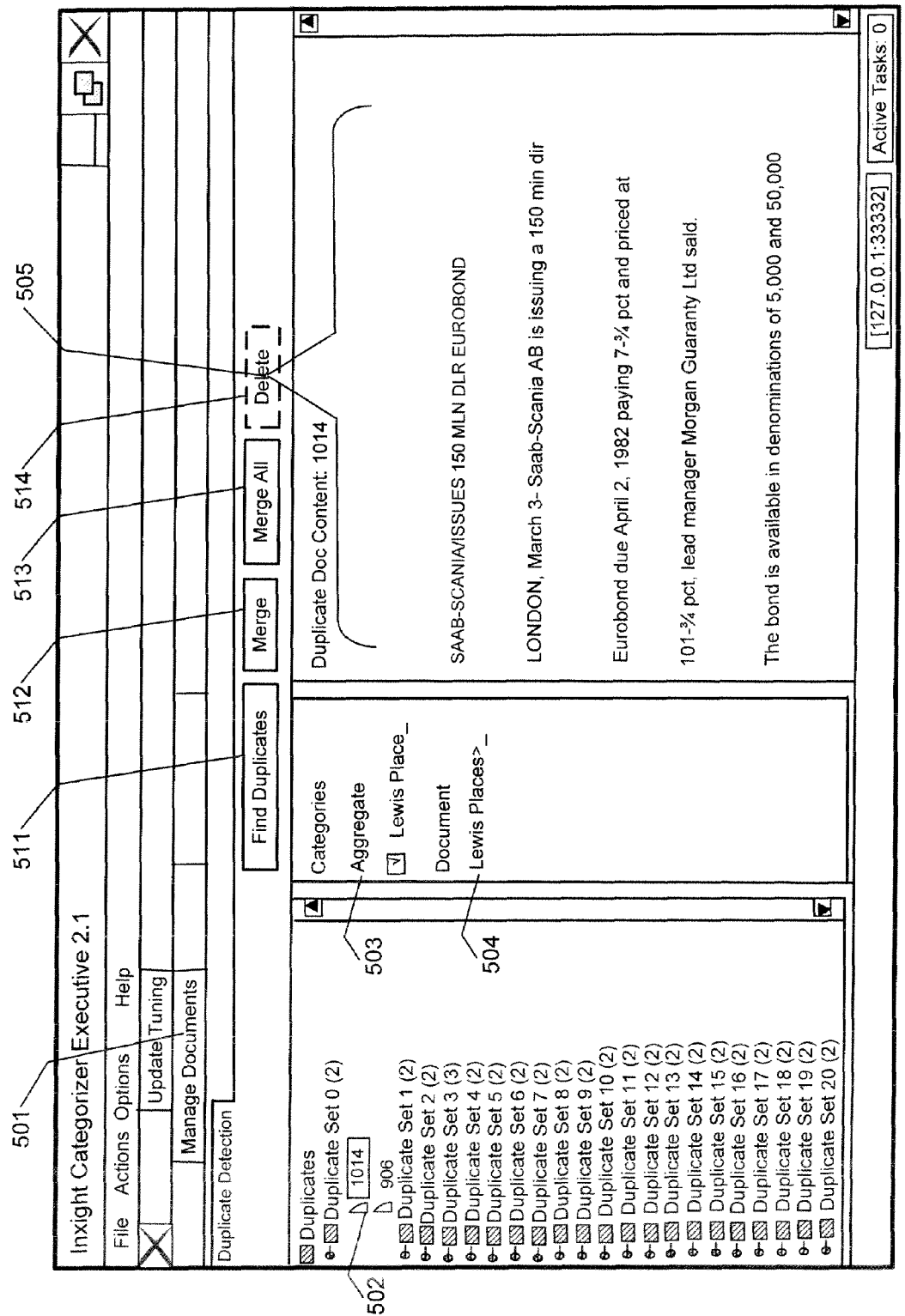
FIG. 5 is a user interface for responding to duplicate indications.

A user working from a terminal 104 may either preset the response of the system to flagged potential duplicates, or the user may respond directly to the flagged duplicates 304. An interface for user response to duplicates is depicted in FIG. 5. The "manage documents" tab 501 provides access to this interface. A series of duplicate document sets appear in a window 502, each set consisting of two or more duplicate documents. For instance, duplicate set 2 includes three potentially duplicate documents. Duplicate set 0, with two potentially duplicate documents, appears in an expanded format in window 502. Items 1014 and 906 are potential duplicates. Item 1014 is selected, indicated by highlighting of that item. Duplicate sets may be assembled response to a user command or button press to "find duplicates" 511. As adapted to automatic categorization, the middle window of this user interface lists the aggregate category assignments for all of the documents the selected duplicate set in window 502, with a check mark indicating which category assignments apply to the selected document 1014. In this embodiment, a list of category assignments applied to document 504 is redundant to the checked aggregate list of category assignment. A user can add categories to the selected document in several ways. A check box 503 can be checked. A merge button 512 can be pressed to merge the duplicate documents and category assignments into one. The "merge all" button 513 can be pressed to merge all of the duplicate document sets into single documents, combining category assignments within each set. A user, alternatively, can reject one of the automatic or previously assigned category assignments offered by the system. For instance, duplicates may be eliminated from a training set of documents that are intended to train an automatic category assignment engine. A check box can be unchecked 503 or a document with erroneous category assignments can be deleted by pressing the delete button 514. To assist the user in evaluating whether two documents are duplicates of one another, a window 505 displays the text of the selected document in window 502. If the selected document were an image, the image or a thumbnail of the image could be displayed, instead of the text. Two or more documents in a duplicate set could be simultaneously displayed. The display of the two documents could be synchronized so that moving a slide bar would adjust the displayed section of both documents. For sounds, wave form segments could be displayed simultaneously.

Figure 3:
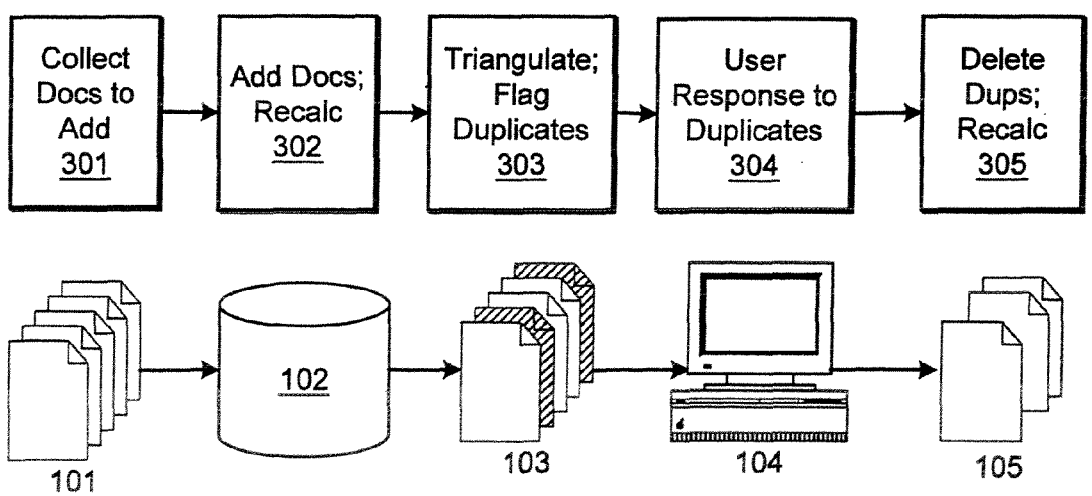
FIG. 3 is a flow diagram for duplicate elimination when documents are first added to a set.

A second embodiment of the triangulation process is depicted in FIG. 4. In this embodiment, less than a complete recalculation of nearest neighbors and similarity measures may be utilized. Several documents 101 are collected as candidates to be added to the data set 301. Nearest neighbors are identified for at least the set of documents to be added and similarity measures are calculated 422. The process of identifying nearest neighbors 222 based on feature vector 211 is conducted for at least the documents to be added 101, as compared to each other and the database 102 and similarity values are calculated. Next, the triangulation process is performed 403. Duplicates are flagged 103. Flagging duplicates can be a one, two or more step process. The difference between FIGS. 3 and 4 is that the documents 101 may not be added to the database 102 until after duplicates have been eliminated or marked for future reference. The range of user responses 404 may be the same in both embodiments. In the FIG. 4 embodiment, duplicates in the set 101 may be deleted 105, 425 before the reduced document set is added to the database 102, 425. Alternatively, the duplicates can the confirmed and flagged for future reference.

Figure 6:
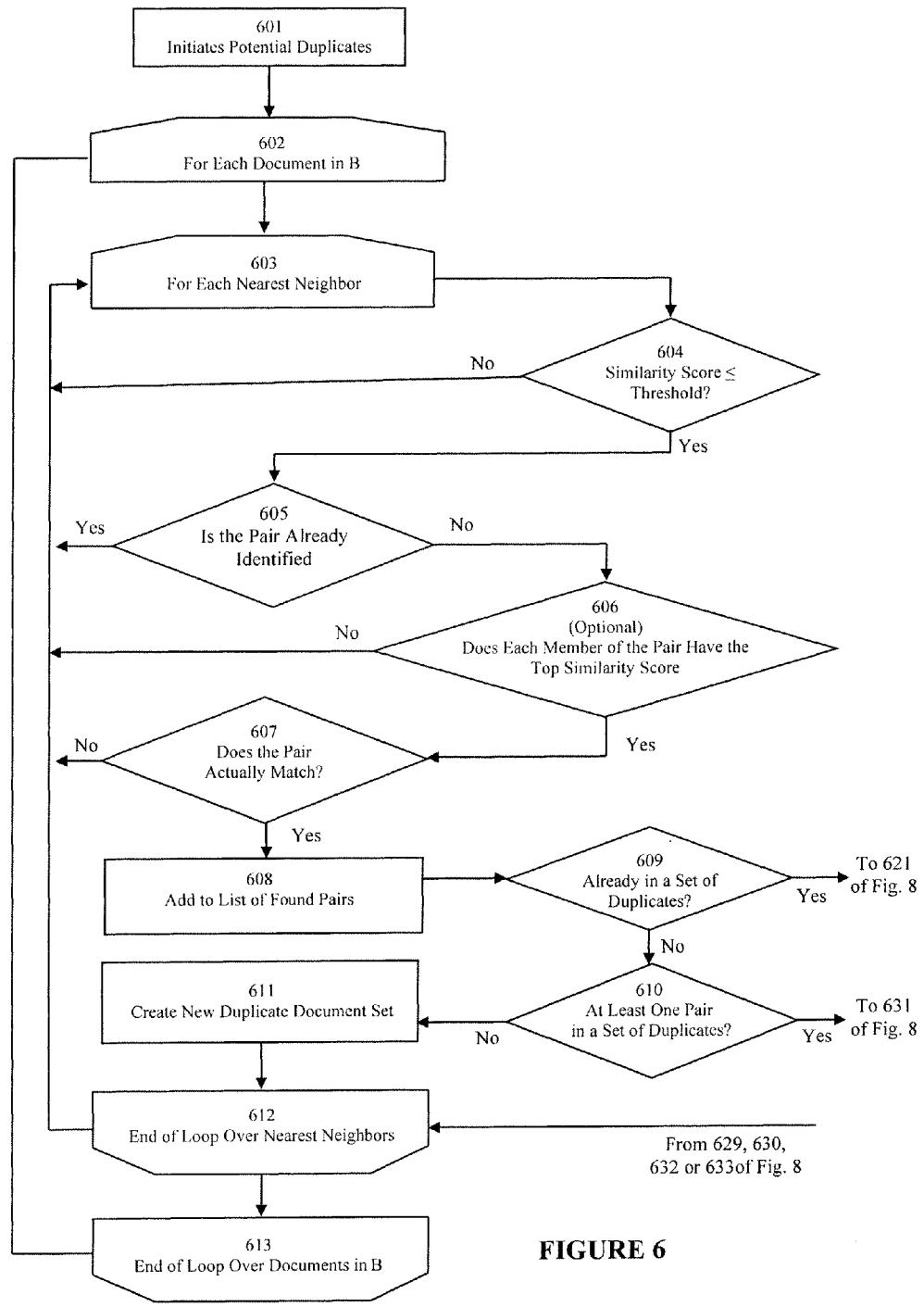
FIG. 6 is a more detailed flow chart of duplicate detection.

FIG. 6 is a more detailed flow chart of one embodiment of the duplicate detection process. Step 601 initiates identification of potential duplicates. The particular embodiment depicted assumes that certain data is available. It assumes that nearest neighbors have already been identified, similarity scores calculated, and nearest neighbors ordered according to similarity scores. Step 602 is the beginning of a loop which iterates for each document in the database. Step 603 is the beginning of a loop which iterates for each nearest neighbor of a particular document. Step 604 is a test for whether the similarity score for a current nearest neighbor is equal to or within a predetermined threshold of a next nearest neighbor. If this test fails, the process loops back to step 603. If the test 604 passes, step 605 determines whether the matching nearest neighbors are already found in among the identified pairs of potential duplicates. If they are, the process is shortcut and control returns to the top of loop 603. If not, the process continues to step 606. If the test 606 fails, the process loops back to step 603. Optionally, the pair are tested for whether they are top scorers for each. Two or more identical documents will have a much higher similarity scores to each other than they will to any non-identical document. Accordingly, two or more identical documents, are likely to be top scorers for each other. The process proceeds to step 607. The test summarized by step 607 is explained in greater detail in the sequence of steps 641-48 depicted in FIG. 7. Overall, the issue is whether the pair of documents with equal or similar similarity scores actually match. If the feature indices vectors or other characteristics of the document pair do not match, the process loops to step 603. If they do match, the pair of documents are added to the list of found pairs in step 608. Adding the pair to the list of duplicate sets involves different steps, depending on whether both, one or neither of the documents is already in a duplicate set. Test 609 determines whether both of the pair of documents is not already in a set of duplicates. If this test fails, control passes to step 610. If it succeeds, control passes to step 621 of FIG. 8. Test 610 determines whether at least one of the pair are already in a set of duplicates. If this test fails, control passes to step 611. If it succeeds, control passes to step 631 of FIG. 8. In step 611, a new duplicate document set is created and the pair of documents are used to create a new set. Step 612 is the end of the loop that began with step 603. If all of the nearest neighbors of a particular document have been processed, flow proceeds to step 613; otherwise, it loops back to step 603. Step 613 is the end of the loop for processing a particular document or data set item. If there are more documents or data set items to process, flow loops to step 602. Otherwise, iteration through this flowchart is complete. After iteration is complete, or, alternatively, throughout the process, the user may be presented with an interface for responding to the detected potential duplicates.

Figure 7:
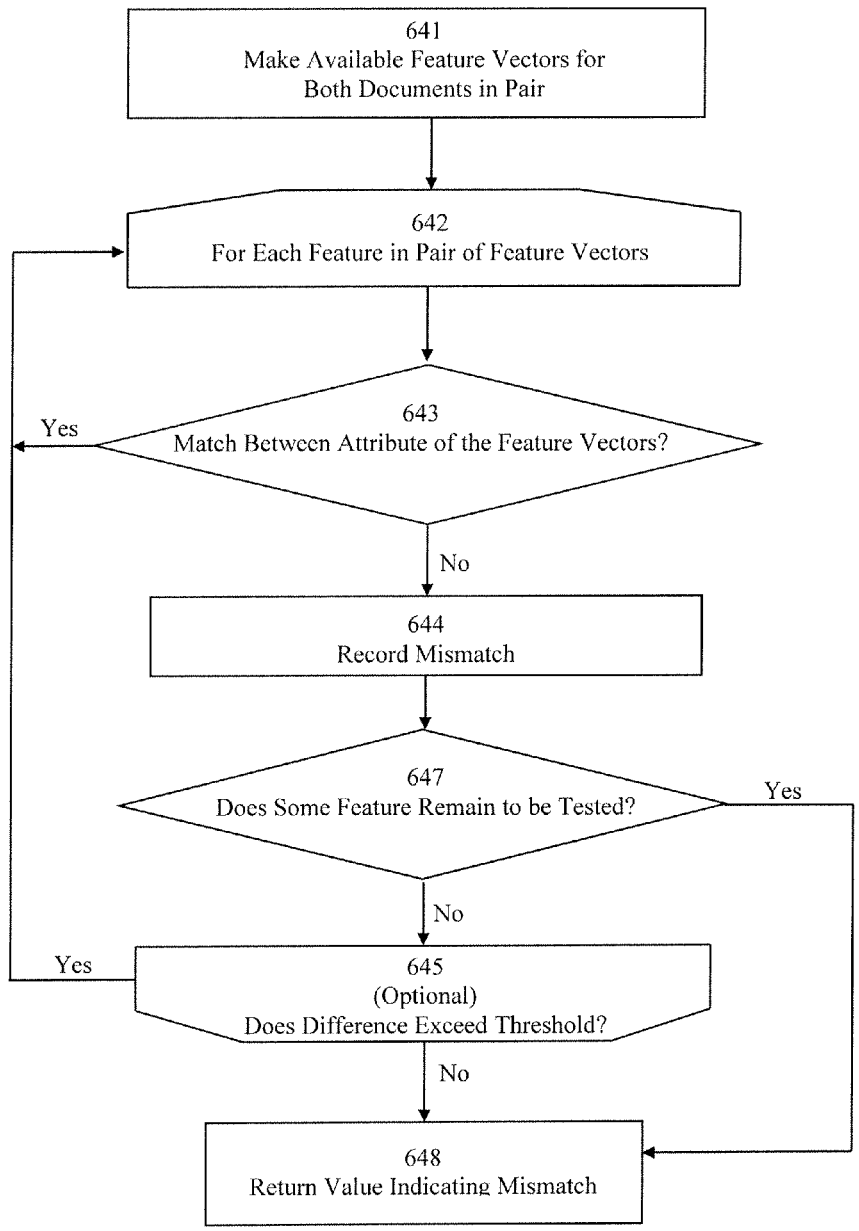
FIG. 7 is a more detailed flow chart of a secondary comparison of documents.

FIG. 7 is a more detailed flow chart of one embodiment of a secondary comparison of documents, corresponding to the test in step 607. This embodiment can be adapted to both a feature vector of occurrence binary values and a feature vector of occurrence frequencies. Step 641 is the beginning of the comparison process, before leaving the step, feature vectors are made available for both documents in the pair. Feature vectors may be retrieved from storage, maybe computed, or may be re-computed. Step 642 is the beginning of a loop for comparison of each feature in a pair of feature vectors. Step 643 is a test of whether there is match between attributes of the two feature vectors. If there is, control returns to the top of the loop, step 642. If there is a mismatch, the mismatch is recorded, step 644. The record may be a simple count of differences or it may be a weighted count of differences. Alternatively, similarities could be counted, but this could take longer than counting differences for mismatched documents. If the data set includes documents subjected to optical character recognition, the closeness or similarity of the two features being tested may be compared, to tolerate inherent differences in OCR performance on successive trials. In this example of OCR comparisons, the feature vectors may be the full text of the documents and the comparison may involve pattern matching between the two documents. In step 645, the process optionally can test whether the difference between the pair of documents has exceeded a threshold. If the threshold has been exceeded, the pair of documents does not match and the process 641-48 is completed with a return value indicating a mismatch. If the threshold has not been exceeded, the process continues to the bottom of the loop, step 647. If some of the features remain to be tested, control flows to the top of the loop, step 642. Otherwise, the process 648 returns a value indicating a match of the features of the pair. Many alternative embodiments of a second phase comparison between two documents which, after triangulation, appear to be similar, are possible as described above.

Figure 8:
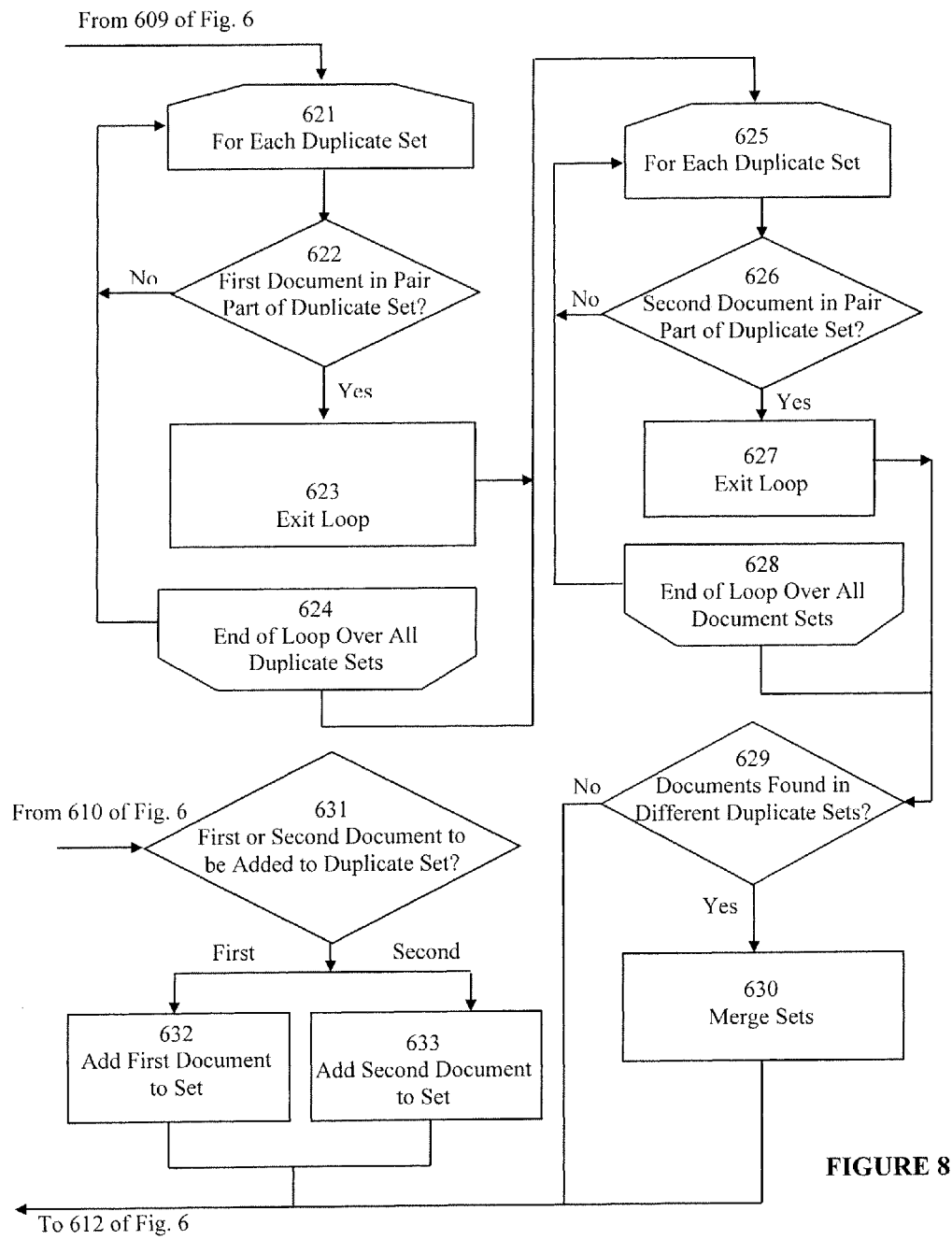
FIG. 8 is a more detailed flow chart of the several additional processing steps involved when both documents in the pair already have been assigned to duplicate sets or when one, but not both of the pair of documents already appear in a set of duplicates.

FIG. 8 is a more detailed flow chart of one embodiment of the several additional process steps involved following step 609 of FIG. 6, when both documents in the pair already have been assigned to duplicate sets. Step 621 is the top of a loop which iterates across all of the duplicate sets for the first document in the pair. In that step 622, the process determines whether the first document in the pair already belongs to the current duplicate set. This may involve iterating through all members of the current duplicate set or otherwise searching the set. If the first document in the pair is not part of the set, control returns to the top of the loop 621 to iterate over the next set. Otherwise, control proceeds to step 623, which is an exit from the loop, directing the process to step 625. Step 624 is the end of the loop, which is reached only if the first document in the pair does not already belong to a duplicate set. This would be error condition, because the premise of step 609 was that both documents in the pair already belonged to duplicate sets. The flow in steps 625-28 is the same in steps 621-24, except that the second document in the pair is processed. At step 629, the first set number in which the first document in the pair was located (per loop 621) and the second set number in which the second document was located (per loop 625) are compared. If the two documents are found in different sets, the different sets are merged into a single set of potential duplicates 630. If the documents are already in the same set, flow returns to step 612 of FIG. 6, which is the bottom of a loop.

FIG. 8 also illustrates one embodiment of the several additional process steps involved following step 610 of FIG. 6 if one, but not both of the pair of documents already appear in a set of duplicates. The test 631 determines whether the first or the second document in the pair is the document that needs to be added to a duplicate set. In step 632 or step 633, the first or second document is added to the appropriate set. Control returns to step 612 of FIG. 6, which is at the bottom of a loop.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in illustrative rather than in a limiting sense. It is contemplated that modifications and combinations will readily occur to those skilled in the art, which modifications and combinations will be within the spirit of the invention and the scope of the following claims.

The invention claimed is:

1. A computer readable storage medium, comprising executable instructions to:
   compute a first measure of similarity between a first document and a reference document, wherein the first measure of similarity is a scalar or a multi-dimensional indication of distance between the first document and the reference document;
   compute a second measure of similarity between a second document and the reference document, wherein the second measure of similarity is a scalar or a multi-dimensional indication of distance between the second document and the reference document;
   compare the first measure of similarity and the second measure of similarity through triangulation to identify a non-exact similarity match between the first document and the second document; and
   perform a direct comparison of the first document and the second document in response to the identified non-exact similarity match to compute a third measure of similarity, wherein the third measure of similarity is a scalar or a multi-dimensional indication of distance between the first document and the second document, and the third measure of similarity has a finer granularity than the first measure of similarity and the second measure of similarity.

2. The computer readable storage medium of claim 1 wherein the executable instructions to compute the first measure of similarity and the second measure of similarity include executable instructions to process a first feature vector associated with the first document, a second feature vector associated with the second document, and a third feature vector associated with the reference document.

3. The computer readable storage medium of claim 1 wherein the executable instructions to compare the first measure of similarity and the second measure of similarity include executable instructions to compare the first measure of similarity and the second measure of similarity to a threshold value.

4. The computer readable storage medium of claim 1 wherein the executable instructions to perform the direct comparison include executable instructions to perform a direct pattern comparison between the first document and the second document.

5. The computer readable storage medium of claim 1 wherein the executable instructions to perform the direct comparison include executable instructions to perform a feature vector comparison between the first document and the second document.

6. The computer readable storage medium of claim 1 wherein both the first measure of similarity and the second measure of similarity are coordinate matching values.

7. The computer readable storage medium of claim 1 wherein both the first measure of similarity and the second measure of similarity are inner product similarity values.

8. The computer readable storage medium of claim 1 wherein both the first measure of similarity and the second measure of similarity are relative term frequency measures.

9. The computer readable storage medium of claim 8 wherein both the first measure of similarity and the second measure of similarity are term frequency-inverse document frequency measures.

10. The computer readable storage medium of claim 1 wherein both the first measure of similarity and the second measure of similarity are cosine measures of angles between n-dimensional vectors.

* * * * *